US012326159B2

(12) United States Patent
Huth et al.

(10) Patent No.: US 12,326,159 B2
(45) Date of Patent: Jun. 10, 2025

(54) ACTUATING APPARATUS FOR AT LEAST ONE FLUIDICALLY DRIVABLE LOAD

(71) Applicant: HYDAC Mobilhydraulik GmbH, Sulzbach / Saar (DE)

(72) Inventors: Heinz-Peter Huth, Überherrn (DE); Marc Anton, Völklingen (DE); Stephan Grün, Heusweiler (DE); Michael Berwanger, Kleinblittersdorf (DE)

(73) Assignee: HYDAC MOBILHYDRAULIK GMBH, Sulzbach/Saar (DE)

( * ) Notice: Subject to any disclaimer, the term of this patent is extended or adjusted under 35 U.S.C. 154(b) by 0 days.

(21) Appl. No.: 18/291,682

(22) PCT Filed: Sep. 2, 2022

(86) PCT No.: PCT/EP2022/074443
§ 371 (c)(1),
(2) Date: Jan. 24, 2024

(87) PCT Pub. No.: WO2023/036700
PCT Pub. Date: Mar. 16, 2023

(65) Prior Publication Data

US 2025/0084871 A1 Mar. 13, 2025

(30) Foreign Application Priority Data

Sep. 11, 2021 (DE) ..................... 10 2021 004 612.9

(51) Int. Cl.
*F15B 1/033* (2006.01)
*E02F 9/22* (2006.01)
*F15B 1/02* (2006.01)

(52) U.S. Cl.
CPC ............ *F15B 1/033* (2013.01); *E02F 9/2207* (2013.01); *E02F 9/2217* (2013.01); *E02F 9/2278* (2013.01); *F15B 1/02* (2013.01)

(58) Field of Classification Search
CPC .......... F15B 1/021; F15B 1/024; F15B 21/14; E02F 9/2217
See application file for complete search history.

(56) References Cited

U.S. PATENT DOCUMENTS 7,117,670 B2 * 10/2006 Kuhn .................... E02F 9/2207 60/469
7,426,827 B2 * 9/2008 Thompson .......... A01M 7/0053 239/164

(Continued)

FOREIGN PATENT DOCUMENTS

DE 10 2005 054 394 5/2006 ................ E02F 9/22
DE 10 2012 208 307 11/2013 ................ E02F 9/22

(Continued)

OTHER PUBLICATIONS

Search report for International Application No. PCT/EP2022/074443, 5 pages, Dec. 5, 2022.

*Primary Examiner* — Michael Leslie
(74) *Attorney, Agent, or Firm* — Slayden Grubert Beard PLLC

(57) ABSTRACT

The invention relates to an actuation device for at least one fluidically drivable load (10), such as a hydraulic actuator, consisting of at least one valve controller (V1) for controlling an alternating movement of each load (10) and at least one suspension device (14) which is connected between the valve controller (V1) and each load (10), wherein the suspension device (14) has an additional valve controller (V2), the valve piston (20) of which can be moved in a corresponding valve housing in a continuously adjustable manner. The invention is characterized in that a storage device (16) of the suspension device (14) is connected to the respective load (10) via a fluid path by means of the (Continued)

additional valve controller (V2) in a suspension position (V2.IV) of the valve piston (20) of the additional valve controller (V2).

20 Claims, 1 Drawing Sheet

(56) References Cited

U.S. PATENT DOCUMENTS

| | | | | |
|---|---|---|---|---|
| 7,621,124 | B2 * | 11/2009 | Mizoguchi | E02F 9/2207 60/469 |
| 7,703,280 | B2 * | 4/2010 | Kobayashi | E02F 9/2207 60/469 |
| 7,878,422 | B2 * | 2/2011 | Heiniger | F15B 1/021 91/405 |
| 8,307,641 | B2 * | 11/2012 | Hanks | E02F 9/2207 60/416 |
| 8,538,640 | B2 * | 9/2013 | Ota | E02F 9/2296 701/50 |
| 9,664,339 | B2 * | 5/2017 | Bittinger | F21K 9/232 |
| 9,932,721 | B2 * | 4/2018 | Vigholm | E02F 9/2207 |
| 10,018,207 | B2 * | 7/2018 | Vigholm | F15B 1/04 |
| 10,145,086 | B2 | 12/2018 | Huth | |
| 10,246,854 | B2 * | 4/2019 | Greer | E02F 9/2217 |
| 10,808,381 | B2 * | 10/2020 | Goebel | E02F 9/2207 |
| 11,350,621 | B2 * | 6/2022 | Bauer | A01M 7/0057 |
| 11,801,725 | B2 * | 10/2023 | Huth | B60G 17/056 |
| 2006/0101815 | A1 | 5/2006 | Kobayashi | 30/413 |
| 2007/0056277 | A1 | 3/2007 | Mizoguchi | 60/413 |
| 2024/0384732 | A1 * | 11/2024 | Grün | F15B 1/021 |

FOREIGN PATENT DOCUMENTS

| | | | |
|---|---|---|---|
| DE | 102014000696 A1 | 7/2015 | E02F 9/22 |
| JP | 2001 200804 | 7/2001 | F15B 11/02 |

* cited by examiner

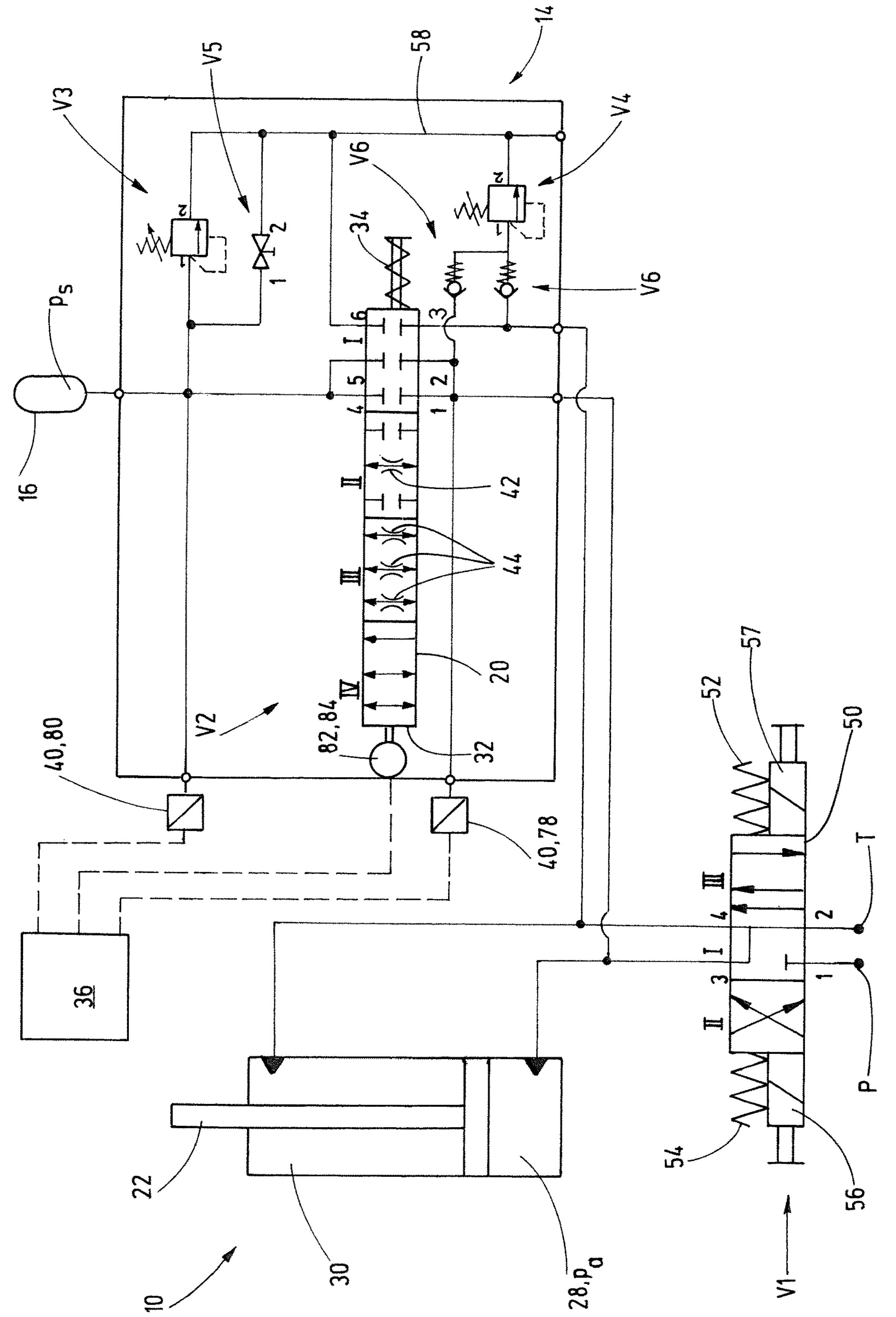
14
58
V3
V5
V4
V6
V6
34
$p_S$
16
I
II
III
IV
42
44
20
V2
82,84
32
40,80
40,78
36
52
57
50
T
III
4
2
I
3
1
II
P
54
56
V1
22
30
$28,p_a$
10

ACTUATING APPARATUS FOR AT LEAST ONE FLUIDICALLY DRIVABLE LOAD

CROSS-REFERENCE TO RELATED APPLICATIONS

This application claims priority to German Patent Application No. DE 10 2021 004 612.9, filed on Sep. 11, 2021 with the German Patent and Trademark Office. The contents of the aforesaid patent application are incorporated herein for all purposes.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The disclosure relates to an actuating apparatus for at least one fluidically drivable load (also referred to a as 'consumer' herein), such as a hydraulic actuator, consisting of at least one valve control device for controlling an alternating movement of the respective load and at least one suspension device which is connected between the valve control device and the respective load, the suspension device having a further valve control device, the valve piston of which can be moved in a corresponding valve housing in a continuously adjustable manner.

DE 10 2014 000 696 A1 discloses an apparatus for a consumer in the form of a hydraulically controllable actuator device. As a control device, the apparatus has a working hydraulics system via which hydraulic fluid can be admitted alternately to two working chambers of the actuator device. A valve device of the apparatus, as part of a suspension device, is connected to the fluid path leading thereto, which valve device has a further control device in the form of a proportional control valve in addition to a switching valve and three logic elements.

By means of the valve device, the actuator device can be connected to an accumulator device as a further part of the suspension device, where beforehand, if the accumulator pressure of the accumulator device is higher than the working pressure in the actuator device, the accumulator pressure is relieved towards a tank via the control valve until the working pressure is reached. During operation of the apparatus, the switching valve is used to establish or block a fluid connection for charging the accumulator device. A first logic element is used to compare the working pressure with the accumulator pressure for the purpose of activating a control line for activating a second and third logic element. The second logic element is used to establish or block a fluid connection between a working chamber of the actuator device and the accumulator device, and the third logic element is used to establish or block a fluid connection between the other working chamber of the actuator device and the tank. If the apparatus is working in a spring/damper mode in which the accumulator pressure is matched to the working pressure, the accumulator device is connected to the actuator device via a fluid path through the second logic element.

SUMMARY

A need exists to provide an actuating apparatus for at least one fluidically drivable load with a simple design.

The need is addressed by the subject matter of the independent claim(s). Embodiments of the invention are described in the dependent claims, the following description, and the drawings.

BRIEF DESCRIPTION OF THE DRAWING

The FIGURE shows an actuating apparatus according an embodiment.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, an actuating apparatus is characterised in that, in a suspension position of the valve piston of the further valve controller, an accumulator device of the suspension device is connected to the respective load (also herein referred to as 'consumer') via a fluid path by means of the additional valve control device.

This means that the actuating apparatus can be configured in a simple manner in terms of its construction. Thus, the logic elements and the switching and control valve provided in prior art according to DE 10 2014 000 696 A1 are obsolete or replaced according to the teachings herein by the suspension device, which is in its simplest embodiment only has one valve. Despite the reduced number of valves and thus also a reduced number of fluid lines and fluid connections, the actuating apparatus has a high level of operational reliability. Providing a smaller number of valves in the suspension device also improves the dynamics of the actuating apparatus and reduces the cost of its production.

In some embodiments, it is provided that the actuating apparatus is used for fluid pressure adjustment of the accumulator pressure of the accumulator device and the load-holding suspension pressure in the load. In the present case, the load/consumer can be configured as an actuator, such as a fluidically drivable motor or a fluidically drivable working cylinder.

In some embodiments, it is provided that a control unit is provided and the further valve control device is configured in such a manner that, via the said valve control device, a suspension pressure in the load and an accumulator pressure of the accumulator device gradually balance each other out and accordingly adjust to each other when appropriately actuated by means of the control unit. When the pressure is gradually equalised in this way, the piston rod of the load performs a gradual and controlled displacement movement. Due to this rather slow movement in contrast to a jump-like movement, an operator of the actuating apparatus has the option to intervene in the movement operation of the piston rod and to influence it. In addition, if the actuating apparatus is used for a load in the form of a working cylinder of a lifting unit suspension system of a mobile machine, the jump-like movement of the piston rod of the load, which can have an adverse effect on the driving stability of the machine and result in loss of and damage to the load lifted by the lifting unit, is prevented when the suspension is activated.

In this case, it may for example be provided that the valve piston can be disposed in a pressure equalisation position, in which said valve piston connects the accumulator device and the load via a further fluid path through the further valve control device, by providing a flow cross-section constriction device which at partially implements the gradual pressure equalisation. Alternatively or additionally, it can be provided that the further valve control device is configured in such a manner that, when its valve piston moves into the pressure equalisation position, particularly when starting from a disconnecting position, establishes the fluid path at least partially in a gradually increasing manner, the suspension pressure in the load and the accumulator pressure of the accumulator device simultaneously balancing each other out via the fluid path and accordingly adjusting to each other in a gradually increasing manner. The accumulator device is switched on by establishing the fluid connection thereto. If different fluid pressures prevail in the load and the accumulator device, there will be a movement of the piston rod of the load after this fluid connection has been established. In particular, due to the gradually increasing establishment of the fluid path, the movement of the piston rod of the load is controlled and gradual. In particular, proportional control grooves of the valve piston of the further valve control device ensure a gradual displacement movement of the piston rod of the actuator.

For example, it can be provided that when the valve piston of the further valve control device is disposed in the suspension position and/or in a damping position, the rod-side working chamber of the actuator is relieved towards the tank port, if necessary via a fluid path through the further valve control device.

In some embodiments, it is provided that an actuating device for the valve piston of the further valve control device and at least one sensor device for detecting status values of the actuating apparatus are provided, which devices are connected to the control unit. For example, it is provided that in each case a pressure sensor detects the fluid pressure in the fluid connection between the load and the further valve control device and/or between the latter and the accumulator device, which pressure sensor is connected to the control unit to transmit its pressure measurement values. As a result, the control unit can constantly determine a differential pressure, based on which the valve piston of the further valve control device can be actuated, in particular for the purpose of adjusting the pressure between the accumulator device and the load.

In some embodiments, it is provided that the actuating device for the valve piston of the further valve control device is configured as an electromotive actuator, which acts on the control side of this valve piston. As a result, only one electrical control line is to be provided to actuate the suspension device, in particular to actuate the further valve control device.

In some embodiments, it is provided that the fluid used is hydraulic fluid, in particular hydraulic oil, so that all fluidic components of the actuating apparatus are hydraulic components.

Furthermore, a mobile machine, such as a construction machine, a wheel loader or mobile excavator, having a lifting unit or axle suspension with the at least one load and the aforementioned actuating apparatus, by means of which the respective load can be actuated, is also the subject matter of the teachings herein.

Another embodiment of an actuating apparatus is explained in greater detail below with reference to the drawing, said apparatus being shown in principle and not to scale by the single FIG.

The actuating apparatus has a valve control device V1 for controlling an alternating movement of the actuator 10, and a suspension device 14 which is connected between the valve control device V1 and the actuator 10. The suspension device 14 has an accumulator device 16 and a further valve control device V2, the valve piston 20 of which can be moved in its valve housing in a continuously adjustable manner. The valve piston 20 of the further valve control device V2 can be disposed in a suspension position V2.IV, in which it connects the accumulator device 16 to the actuator 10 via a fluid path through the further valve control device V2.

The actuating apparatus is used for fluid pressure adjustment of the accumulator pressure $p_s$ of the accumulator device 16 and the load-holding suspension pressure $p_a$ in the actuator 10 for the purpose of subsequent, in particular damped, suspension of a piston rod unit 22 of the actuator 10 by means of the accumulator pressure $p_s$ of the accumulator device 16.

The actuating apparatus has a pressure supply port P which is connected via a fluid line to a piston-side working chamber 28 of the actuator 10. A rod-side working chamber 30 of the actuator 10 is connected via a further fluid line to a tank port T. The valve control device V1 is connected into the two fluid lines as the main control valve. Depending on the switching position of the valve V1, the aforementioned connection can also be reversed.

A first port V2.1 of the further valve control device V2 of the suspension device 14 and its second port V2.2 are fluidically connected to a branching point which is connected via a fluid line to the fluid line between the valve control device V1 and the piston-side working chamber 28 of the actuator 10. A third port V2.3 of the further valve control device V2 is connected via a further fluid line to the fluid line between the valve control device V1 and the rod-side working chamber of the actuator 10. A fourth port V2.4 of the further valve control device V2 and its fifth port V2.5 are fluidically connected to a branching point which is connected via a fluid line to a fluid side of the accumulator device 16. A sixth port V2.6 of the further valve control device V2 is connected to a tank line 58.

The further valve control device V2 is configured as a proportional valve. An end position V2.IV of the valve piston 20 of the further valve control device V2 corresponds to its suspension position V2.IV. In the suspension position V2.IV, the valve piston 20 connects the first V2.1 to the fourth V2.4 port, the second V2.2 to the fifth V2.5 port and the third V2.3 to the sixth V2.6 port via one fluid path each which is for example free in each case of flow cross-section constriction devices. To actuate the valve piston 20, its one control side 32 can be acted upon by an actuating device 82, against the force of a compression spring 34, by means of a force towards the one end position V2.IV in the form of the suspension position V2.IV.

A pressure sensor 40, 78 is provided to detect the fluid pressure $P_a$ at the branching point which is connected to the first V2.1 and second V2.2 port of the further valve control device V2. A further pressure sensor 40, 80 is provided to detect the fluid pressure $p_s$ in the fluid line between the branching point connected to the fourth V2.4 and fifth V2.5 port of the further valve control device V2 and the accumulator device 16. The respective pressure sensor 40, 78, 80 is connected to a control unit 36 of the actuating apparatus to transmit its measured values.

Using the measured values of the pressure sensors 40, 78, 80, the control unit 36 constantly determines a differential pressure, based on which the valve piston 20 of the further valve control device V2 is actuated by the control unit 36, in particular for the purpose of pressure adjustment of the accumulator pressure $p_s$ of the accumulator device 16 and of the suspension pressure $p_a$ in the piston-side working chamber 28 of the actuator 10.

The actuating device 82 is configured as an electromotive actuator 82, the electric motor 84 of which can be actuated by the control unit 36 via an electrical line and which acts on the one control side 32 of the valve piston 20 of the further valve control device V2 by means of a positioning force.

The valve piston 20 of the further valve control device V2 can be disposed in a pressure equalisation position V2.II, in which the second V2.2 and the fifth V2.5 port of the further valve control device V2 are connected to one another via a fluid path in which a flow cross-section constriction device 42 in the form of a throttle 42 or orifice 42 is connected. This flow cross-section constriction device 42 is used in the pressure equalisation position V2.II for throttling the fluid flow between the second V2.2 and the fifth V2.5 port of the further valve control device V2, whereby the gradual pressure equalisation is implemented between the accumulator device 16 and the actuator 10. All other ports of the further valve control device V2 are disconnected from one another in the pressure equalisation position V2.II of the valve piston 20.

The valve piston 20 of the further valve control device V2 has a damping position V2.III between the suspension position V2.IV and the pressure equalisation position V2.II. In the damping position V2.III, the first port V2.1 of the further valve control device V2 is connected to its fourth V2.4 port, its second V2.2 port is connected to its fifth V2.5 port and its third V2.3 port is connected to its sixth V2.6 port via fluid path in each case in which a flow cross-section constriction device 44 in the form of a throttle 44 or orifice 44 is connected. In the damping position V2.III, these flow cross-section constriction devices 44 are each used to throttle the fluid flow through the respective fluid path, whereby a damped suspension can be implemented.

The valve piston 20 of the further valve control device V2 is disposed in its other end position V2.I when not actuated. The other end position V2.I corresponds to a disconnecting position V2.I of the valve piston 20 in which it disconnects all ports of the further valve control device V2 from one another.

An inlet port V3.1 of a pressure-limiting valve V3 for limiting the maximum accumulator pressure $p_s$, the outlet port V3.2 of which opens into the tank line 58, is connected to the fluid line between the branching point connected to the fourth V2.4 port and fifth V2.5 port of the further valve control device and the accumulator device 16. The accumulator pressure is for example limited to a maximum of 280 bar. A control fluid pressure, tapped at its inlet port V3.1, acts on one control side of a valve piston of the pressure-limiting valve V3 and is routed to this control side via a control line. By means of this control fluid pressure, the valve piston of the pressure-limiting valve V3 can be actuated against the force of an adjustable compression spring. An inlet port V4.1 of a further pressure-limiting valve V4 for limiting the maximum system pressure, in particular the fluid pressure of the actuating apparatus, is connected to the branching point connected to the first V2.1 and the second V2.2 port of the further valve control device V2 and to the fluid line connected to the third port V2.3 of the further valve control device V2, the outlet port V4.2 of said pressure-limiting valve V4 opening into the tank line 58. The system pressure is for example limited to a maximum of 420 bar. The further pressure-limiting valve V4 is configured correspondingly to the pressure-limiting valve V3. A suction valve (not shown) can be connected in parallel to valve V4 in the lowest connecting line shown in the FIG., for example in the form of a spring-loaded check valve.

A shut-off valve V5 is disposed parallel to the pressure-limiting valve V3. The shut-off valve V5 is connected with its one port V5.1 to a fluid line which connects the fluid line connected to the accumulator device 16 to the pressure-limiting valve V3. The shut-off valve V5 is connected with its other port V5.2 to the tank line 58. During operation of the actuating apparatus, the shut-off valve V5 is disposed in its blocking position and can be moved to its opening position to release the accumulator pressure $p_s$ from the accumulator device 16, for example for maintenance work. A check valve V6 is connected in the fluid line between the branching point connected to the first V2.1 and second V2.2 port of the further valve control device V2 and the further pressure-limiting valve V4. A further check valve V6 is connected in the fluid line which connects the fluid line connected to the third port V2.3 of the further valve control device V2 to the further pressure-limiting valve V4. The two check valves each open against the force of a compression spring in the direction of the further pressure-limiting valve V4.

A first port V1.1 of the valve control device V1 is fluidically connected to the pressure supply port P and a second port V1.2 is fluidically connected to the tank port T. A third port V1.3 of the valve control device V1 is connected via a further fluid line to the piston-side working chamber 28 of the actuator 10 and a fourth port V1.4 is connected via a further fluid line to the rod-side working chamber 30 of the actuator 10. The valve control device V1 is configured as a 4/3 proportional directional-control valve V1. Starting in each case from its unactuated first position V1.I shown in the FIGURES, a valve piston 50 of the valve control device V1 can be moved into its second position V1.II by means of a solenoid actuating device 56 against the force of a compression spring 52 and into its third position V1.III by means of a further solenoid actuating device 57 against the force of a further compression spring 54. Any other type of actuation can also be selected instead of solenoid actuation.

The second V1.II and the third V1.III position correspond to the two end positions V1.II, V1.III of the valve piston 50. In the first position V1.I, the unactuated valve piston 50 is held by the two compression springs 52, 54 and connects the second V1.2 and the third V1.3 and the fourth V1.4 port of the valve control device V1 to each other, whereas its first port V1.1 is disconnected from all other ports. Disposed in the second position V1.II, the valve piston 50 of the valve control device V1 connects its first V1.1 and its fourth V1.4 port to each other and its third V1.3 and its second V1.2 port to each other. Disposed in the third position V1.III, the valve piston 50 of the valve control device V1 connects its first V1.1 and its third V1.3 port to each other and its fourth V1.4 and its second V1.2 port to each other.

The valve control device V1 and the further valve control device V2 can be actuated independently of each other, in particular by the control unit 36, and their valve pistons 20, 50 can accordingly be moved independently of each other.

The actuator 10 is configured as a working cylinder 10. The actuating apparatus is part of a mobile machine, not shown in the FIGURES, in particular a construction machine, such as a wheel loader or a mobile excavator, having a lifting unit or axle suspension with the working cylinder 10. Lifting unit suspension systems, which comprise the actuating apparatus and a lifting unit, are used for increasing the comfort and driving safety of the machine. An axle suspension can also be used instead of a lifting unit.

Software is implemented on the control unit 36 by means of which software the actuating apparatus, in particular the actuating devices 82, 56, 57 of the valve control devices V1, V2, can be actuated, for example as a function of the measured values of the pressure sensors 40, 78, 80, in such a manner that the actuating apparatus performs the following functions:

- Free suspension, i.e. free of flow constriction devices, of the piston rod unit 22 of the actuator 10 by disposing the valve piston 20 of the further valve control device V2 in the suspension position V2.IV; and/or
- Damped suspension of the piston rod unit 22 of the actuator 10 by disposing the valve piston 20 of the further valve control device V2 in the damping position V2.III; and/or
- Pressure equalisation of the accumulator pressure $p_s$ of the accumulator device 16 and of the load-holding suspension pressure $p_a$ in the piston-side working chamber 28 of the actuator 10, if necessary during a lifting or lowering operation of the lifting unit of the machine, by disposing the valve piston 20 of the further valve control device V2 in the pressure equalisation position V2.II; and/or
- Maintaining a minimum accumulator pressure ($p_s$) in the accumulator device 16, which must be reached because the reactivity of the system depends on it, as a function of the measured values of the pressure sensor 40, 80, in particular when the valve piston 20 of the further valve control device V2 is disposed in the disconnecting position V2.I; and/or
- Deactivated suspension and no pressure equalisation, if necessary with the lifting unit in work mode, by disposing the valve piston 20 of the further valve control device V2 in the 5 disconnecting position V2.I; and/or
- Monitoring a maximum accumulator pressure ($p_s$) in the accumulator device 16, in particular when the valve piston 20 of the further valve control device V2 is disposed in the 10 pressure equalisation V2.II, damping V2.III or suspension position V2.IV.

One benefit of this software solution is that it can be retrofitted to existing systems.

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word “comprising” does not exclude other elements or steps, and the indefinite article “a” or “an” does not exclude a plurality. A single processor, module or other unit or device may fulfil the functions of several items recited in the claims.

The term “exemplary” used throughout the specification means “serving as an example, instance, or exemplification” and does not mean “preferred” or “having advantages” over other embodiments. The term “in particular” and “particularly” used throughout the specification means “for example” or “for instance”.

The mere fact that certain measures are recited in mutually different dependent claims or embodiments does not indicate that a combination of these measures cannot be used to advantage. Any reference signs in the claims should not be construed as limiting the scope.

What is claimed is:

1. An actuating apparatus for at least one fluidically drivable load, comprising at least one valve control device for controlling an alternating movement of the respective load and at least one suspension device which is connected between the valve control device and the respective load; wherein the suspension device has a further valve control device; wherein a valve piston of the further valve control device is movable in a corresponding valve housing in a continuously adjustable manner;

an accumulator device of the suspension device is connected to the respective load via a fluid path by means of the further valve control device in a suspension position of the valve piston of the further valve control device, a pressure sensor is provided to detect a fluid pressure at a first branching point which is connected to a first and a second port of the further valve control device:

a further pressure sensor is provided to detect a fluid pressure in a fluid line between a second branching point connected to a fourth and a fifth port of the further valve control device and the accumulator device;

the pressure sensor and the further pressure sensor are connected to a control unit of the actuating apparatus to transmit measured values to the control unit, and wherein the further valve control device is configured so that, when actuated by the control unit, a suspension pressure in the load and an accumulator pressure of the accumulator device balance each other out and accordingly adjust to each other.

2. The actuating apparatus of claim 1, wherein the valve piston is disposable in a pressure equalization position, in which said valve piston connects the accumulator device and the load via a further fluid path through the further valve control device, by providing a flow cross-section constriction device which at least partially implements the gradual pressure equalization.

3. The actuating apparatus of claim 2, wherein an actuating device for the valve piston of the further valve control device and at least one sensor device for detecting status values of the actuating apparatus are provided, which are connected to the control unit.

4. The actuating apparatus of claim 3, wherein the actuating device for the valve piston of the further valve control device is configured as an electromotive actuator, which acts on a control side of the valve piston.

5. The actuating apparatus of claim 1, wherein an actuating device for the valve piston of the further valve control device and at least one sensor device for detecting status values of the actuating apparatus are provided, which are connected to the control unit.

6. The actuating apparatus of claim 5, wherein the actuating device for the valve piston of the further valve control device is configured as an electromotive actuator, which acts on a control side of the valve piston.

7. The actuating apparatus of claim 1, wherein the valve piston of the further valve control device is disposable in a damping position in which the accumulator device is connected to the respective load via at least one further fluid path through the further valve control device, in which fluid path a flow cross-section constriction device is connected in each case.

8. The actuating apparatus of claim 1, wherein the valve piston of the further valve control device is disposable in a disconnecting position in which said valve control device disconnects all connections of the further valve control device from one other.

9. The actuating apparatus of claim 1, wherein a pressure-limiting valve, which limits the maximum accumulator pressure of the accumulator device, and/or a further pressure-limiting valve is provided, which limits the maximum fluid pressure of the actuating apparatus.

10. The actuating apparatus of claim 1, wherein the further valve control device is configured as a 6/4 proportional directional-control valve in spool design.

11. A mobile machine with a lifting unit or axle suspension having at least one load, wherein the actuating apparatus of claim 1 is provided using which the respective load is actuated.

12. The actuating apparatus of claim 1, wherein the at least one fluidically drivable load comprises a hydraulic actuator.

13. An actuating apparatus for at least one fluidically drivable load, comprising at least one valve control device for controlling an alternating movement of the respective load and at least one suspension device which is connected between the valve control device and the respective load; wherein the suspension device has a further valve control device;

a valve piston of the further valve control device is movable in a corresponding valve housing in a continuously adjustable manner;

an accumulator device of the suspension device is connected to the respective load via a fluid path by means of the additional valve control device in a suspension position of the valve piston of the further valve control device; and wherein the valve piston of the further valve control device is disposable in a damping position in which the accumulator device is connected to the respective load via at least one further fluid path through the further valve control device, in which fluid path a flow cross-section constriction device is connected in each case.

14. The actuating apparatus of claim 13, wherein the at least one fluidically drivable load comprises a hydraulic actuator.

15. The actuating apparatus of claim 13, wherein a control unit is provided and the further valve control device is configured so that, when actuated by the control unit, a suspension pressure in the load and an accumulator pressure of the accumulator device balance each other out and accordingly adjust to each other.

16. The actuating apparatus of claim 13, wherein the valve piston is disposable in a pressure equalization position, in which said valve piston connects the accumulator device and the load via a further fluid path through the further valve control device, by providing a flow cross-section constriction device which at least partially implements the gradual pressure equalization.

17. The actuating apparatus of claim 13, wherein an actuating device for the valve piston of the further valve control device and at least one sensor device for detecting status values of the actuating apparatus are provided, which are connected to the control unit.

18. The actuating apparatus of claim 13, wherein a pressure sensor, which detects the suspension pressure of the load and/or a further pressure sensor, which detects the accumulator pressure of the accumulator device, is provided, which is connected to a control unit for transmitting pressure measurement values.

19. The actuating apparatus of claim 13, wherein the actuating device for the valve piston of the further valve control device is configured as an electromotive actuator, which acts on a control side of the valve piston.

20. The actuating apparatus of claim 13, wherein the valve piston of the further valve control device is disposable in a damping position in which the accumulator device is connected to the respective load via at least one further fluid path through the further valve control device, in which fluid path a flow cross-section constriction device is connected in each case.

* * * * *